United States Patent
Salter et al.

(10) Patent No.: US 10,422,501 B2
(45) Date of Patent: Sep. 24, 2019

(54) VEHICLE LIGHTING ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); Matthew Cramer Mullen, New Hudson, MI (US); Christopher Charles Hunt, Livonia, MI (US); Doug H. Randlett, Metamora, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 286 days.

(21) Appl. No.: 15/378,752

(22) Filed: Dec. 14, 2016

(65) Prior Publication Data
US 2018/0163942 A1    Jun. 14, 2018

(51) Int. Cl.
| | | |
|---|---|---|
| *F21S 43/20* | (2018.01) | |
| *F21S 43/14* | (2018.01) | |
| *F21S 45/10* | (2018.01) | |
| *B60Q 1/26* | (2006.01) | |
| *G01C 21/16* | (2006.01) | |
| *H05B 33/08* | (2006.01) | |
| *H05B 37/02* | (2006.01) | |

(Continued)

(52) U.S. Cl.
CPC ............ *F21S 43/26* (2018.01); *B60Q 1/2611* (2013.01); *B60Q 1/2661* (2013.01); *B60Q 1/323* (2013.01); *F21S 43/14* (2018.01); *F21S 43/16* (2018.01); *F21S 45/10* (2018.01); *G01C 21/165* (2013.01); *H05B 33/0854* (2013.01); *H05B 37/0227* (2013.01); *B60Q 2400/20* (2013.01); *F21Y 2113/13* (2016.08); *F21Y 2115/10* (2016.08); *H05B 33/0842* (2013.01); *H05B 37/0218* (2013.01)

(58) Field of Classification Search
CPC .. F21S 45/10; F21S 43/50; F21S 43/14; F21S 43/26; F21Y 2113/10–17; B60Q 1/2611; B60Q 1/2661; B60Q 2044/20; B60Q 1/323; B60Q 3/78; F21K 9/64
See application file for complete search history.

(56) References Cited

U.S. PATENT DOCUMENTS

| | | | | |
|---|---|---|---|---|
| 1,416,467 A | * | 5/1922 | Hobbs | B60Q 1/16 362/487 |
| 1,481,057 A | * | 1/1924 | Gott | B60Q 1/323 362/495 |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Julie A Bannan
(74) *Attorney, Agent, or Firm* — Vichit Chea; Price Heneveld LLP (57) ABSTRACT

A vehicle lighting assembly is provided herein. The vehicle lighting assembly includes a back panel configured to couple to a vehicle. A plurality of light sources emit a common wavelength of light. A first portion of the plurality of light sources is operably coupled with a luminescent structure. A second portion of light sources emits the common wavelength of light from an overmold material that is disposed outboard of the first and second portions of light sources.

6 Claims, 9 Drawing Sheets

(51) Int. Cl.
*F21S 43/16* (2018.01)
*B60Q 1/32* (2006.01)
*F21Y 113/13* (2016.01)
*F21Y 115/10* (2016.01)

(56) References Cited

U.S. PATENT DOCUMENTS

| | | | |
|---|---|---|---|
| 1,482,769 A * | 2/1924 | Sutton | B60Q 1/32 |
| | | | 362/310 |
| 2,486,859 A | 11/1949 | Meijer et al. | |
| 2,543,226 A * | 2/1951 | Briggs | B60Q 1/32 |
| | | | 362/506 |
| 4,879,543 A * | 11/1989 | Smith, Sr. | B60Q 1/323 |
| | | | 340/473 |
| 5,053,930 A | 10/1991 | Benavides | |
| 5,434,013 A | 7/1995 | Fernandez | |
| 5,528,468 A * | 6/1996 | Stanton | B60Q 1/323 |
| | | | 362/267 |
| 5,709,453 A | 1/1998 | Krent et al. | |
| 5,839,718 A | 11/1998 | Hase et al. | |
| 5,893,638 A * | 4/1999 | Hufner | B60Q 1/32 |
| | | | 340/468 |
| 6,018,295 A * | 1/2000 | Jewell | B60Q 1/32 |
| | | | 340/464 |
| 6,031,511 A | 2/2000 | DeLuca et al. | |
| 6,117,362 A | 9/2000 | Yen et al. | |
| 6,149,288 A * | 11/2000 | Huang | B60Q 1/2615 |
| | | | 362/545 |
| 6,152,590 A * | 11/2000 | Furst | B60Q 1/2665 |
| | | | 362/545 |
| 6,158,882 A * | 12/2000 | Bischoff, Jr. | F21V 23/005 |
| | | | 362/249.02 |
| 6,294,990 B1 | 9/2001 | Knoll et al. | |
| 6,416,209 B1 * | 7/2002 | Abbott | B60Q 1/323 |
| | | | 362/327 |
| 6,419,854 B1 | 7/2002 | Yocom et al. | |
| 6,461,028 B1 * | 10/2002 | Huang | B60Q 1/32 |
| | | | 362/505 |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,038,593 B2 | 5/2006 | Pederson | |
| 7,161,472 B2 | 1/2007 | Strumalo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,347,576 B2 | 3/2008 | Wang et al. | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,621,662 B1 | 11/2009 | Colbert | |
| 7,635,212 B2 | 12/2009 | Seidler | |
| 7,723,744 B2 * | 5/2010 | Gillies | H01L 33/502 |
| | | | 257/788 |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | Ia Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,408,766 B2 | 4/2013 | Wilson et al. | |
| 8,415,642 B2 | 4/2013 | Kingsley et al. | |
| 8,421,811 B2 | 4/2013 | Odiand et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,653,553 B2 | 2/2014 | Yamazaki et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,905,610 B2 | 12/2014 | Coleman et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,067,530 B2 | 6/2015 | Bayersdorfer et al. | |
| 9,187,034 B2 | 11/2015 | Tarahomi et al. | |
| 9,198,251 B2 * | 11/2015 | Ter Weeme | H05B 33/0863 |
| 9,299,887 B2 | 3/2016 | Lowenthal et al. | |
| 9,315,148 B2 | 4/2016 | Schwenke et al. | |
| 9,452,709 B2 | 9/2016 | Aburto Crespo | |
| 9,568,659 B2 | 2/2017 | Verger et al. | |
| 9,616,812 B2 | 4/2017 | Sawayanagi | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0114362 A1 * | 6/2004 | Chang | B60Q 1/32 |
| | | | 362/219 |
| 2004/0213088 A1 | 10/2004 | Fuwausa | |
| 2005/0084229 A1 | 4/2005 | Babbitt et al. | |
| 2005/0189795 A1 | 9/2005 | Roessler | |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0274087 A1 | 11/2007 | Herold | |
| 2007/0285938 A1 | 12/2007 | Palmer et al. | |
| 2007/0297045 A1 | 12/2007 | Sakai et al. | |
| 2008/0106887 A1 * | 5/2008 | Salsbury | F21K 9/64 |
| | | | 362/84 |
| 2008/0205075 A1 | 8/2008 | Hikmet et al. | |
| 2008/0238649 A1 | 10/2008 | Arszman et al. | |
| 2008/0303407 A1 * | 12/2008 | Brunner | C09K 11/0883 |
| | | | 313/496 |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |

(56) References Cited

U.S. PATENT DOCUMENTS

| | | |
|---|---|---|
| 2009/0260562 A1 | 10/2009 | Folstad et al. |
| 2009/0262515 A1 | 10/2009 | Lee et al. |
| 2010/0102736 A1 | 4/2010 | Hessling |
| 2010/0127288 A1* | 5/2010 | Kuo .................. H01L 33/483 257/98 |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0043552 A1* | 2/2012 | David .................. C09K 11/0883 257/76 |
| 2012/0104954 A1 | 5/2012 | Huang |
| 2012/0183677 A1 | 7/2012 | Agrawal et al. |
| 2012/0280528 A1* | 11/2012 | Dellock .................. B60R 1/06 296/1.08 |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0209931 A1* | 7/2014 | Liao .................. H01L 33/507 257/88 |
| 2014/0211498 A1 | 7/2014 | Cannon et al. |
| 2014/0240844 A1* | 8/2014 | Scherrer .................. G02B 3/00 359/642 |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sure et al. |
| 2015/0049459 A1* | 2/2015 | Peeters .................. H01L 25/0753 362/84 |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0251597 A1* | 9/2015 | Salter .................. H05B 37/0218 362/510 |
| 2015/0267881 A1 | 9/2015 | Salter et al. |
| 2015/0307033 A1 | 10/2015 | Preisler et al. |
| 2015/0311406 A1* | 10/2015 | Lange .................. H01L 25/0753 257/89 |
| 2015/0338080 A1* | 11/2015 | Dexter .................. F21V 23/06 362/218 |
| 2016/0000018 A1* | 1/2016 | Van Elmpt .................. A01G 7/045 47/17 |
| 2016/0016506 A1 | 1/2016 | Collins et al. |
| 2016/0017219 A1* | 1/2016 | Lub .................. C09B 5/62 313/504 |
| 2016/0102819 A1 | 4/2016 | Misawa et al. |
| 2016/0131327 A1 | 5/2016 | Moon et al. |
| 2016/0161067 A1* | 6/2016 | Oepts .................. H01L 25/0753 362/84 |
| 2016/0236613 A1 | 8/2016 | Trier |
| 2016/0240794 A1 | 8/2016 | Yamada et al. |
| 2017/0111972 A1* | 4/2017 | Oepts .................. H05B 33/0857 |
| 2017/0158125 A1 | 6/2017 | Schuett et al. |
| 2017/0167686 A1* | 6/2017 | Kang .................. F21S 41/125 |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10242434 A1 | 3/2004 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2008145718 A1 | 12/2008 |
| WO | 2014068440 A1 | 5/2014 |
| WO | 2014161927 A1 | 10/2014 |
| WO | 2015039893 A1 | 3/2015 |

* cited by examiner

VEHICLE LIGHTING ASSEMBLY

FIELD OF THE INVENTION

The present disclosure generally relates to vehicle lighting assemblies, and more particularly, to vehicle lighting assemblies employing one or more luminescent structures.

BACKGROUND OF THE INVENTION

Illumination arising from the use of luminescent structures offers a unique and attractive viewing experience. It is therefore desired to implement such structures in automotive vehicles for various lighting applications.

SUMMARY OF THE INVENTION

According to one aspect of the present disclosure, a vehicle lighting assembly is disclosed. The vehicle lighting assembly includes a back panel configured to couple to a vehicle. A plurality of light sources emit a common wavelength of light. A first portion of the plurality of light sources is operably coupled with a luminescent structure. A second portion of light sources emits the common wavelength of light from an overmold material that is disposed outboard of the first and second portions of light sources.

According to another aspect of the present disclosure, a vehicle lighting assembly is disclosed. The vehicle lighting assembly includes a substrate disposed on a back panel. A first light source is disposed on the substrate and is operably coupled with a luminescent structure. A second light source is disposed on the substrate and is configured to emit a common wavelength of light as the first light source. An overmold material surrounds the first and second light sources. At least two wavelengths of light are emitted through the overmold material.

According to yet another aspect of the present disclosure, a vehicle lighting assembly is disclosed. The vehicle lighting assembly includes a substrate. A first portion of light sources is operably coupled with a luminescent structure. A second portion of light sources has more light sources than the first portion of light sources. The first and second portions of light sources emit a common wavelength of light.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
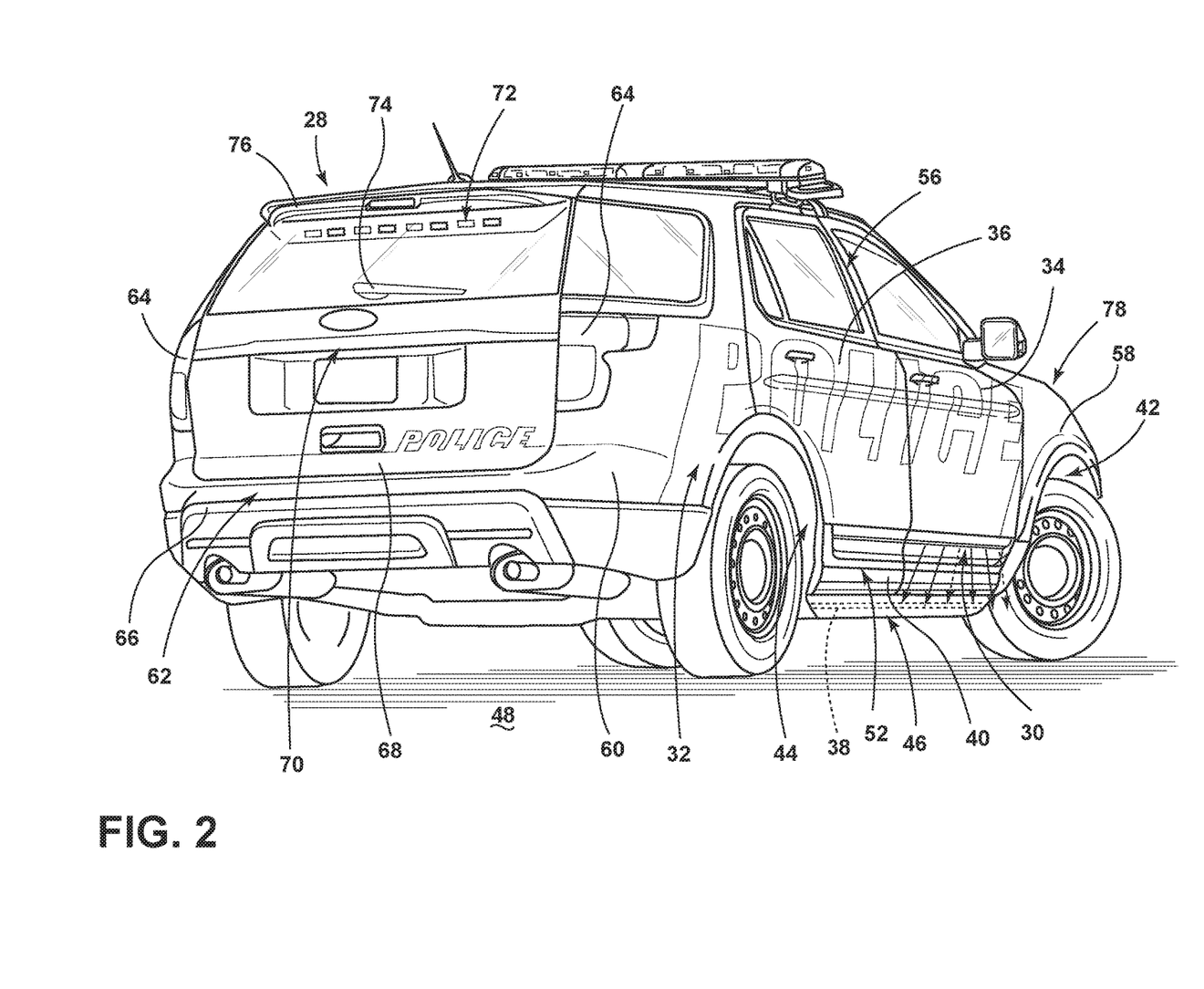
FIG. 2 is a rear perspective view of a vehicle having a trim member containing a lighting assembly, according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting assembly. The lighting assembly may advantageously employ one or more phosphorescent and/or luminescent structures to illuminate in response to predefined events. The one or more luminescent structures may be configured to convert ambient light and/or light received from an associated light source and re-emit the light at a different wavelength typically found in the visible spectrum.

Figure 1A:
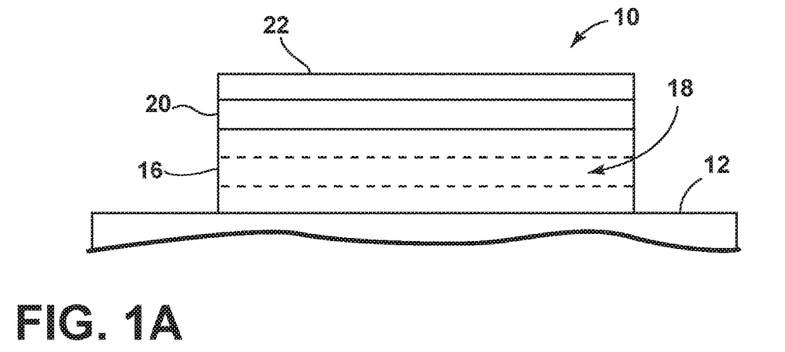
FIG. 1A is a side view of a luminescent structure rendered as a coating for use in a luminescent latch assembly, according to various embodiments.
Figure 1B:
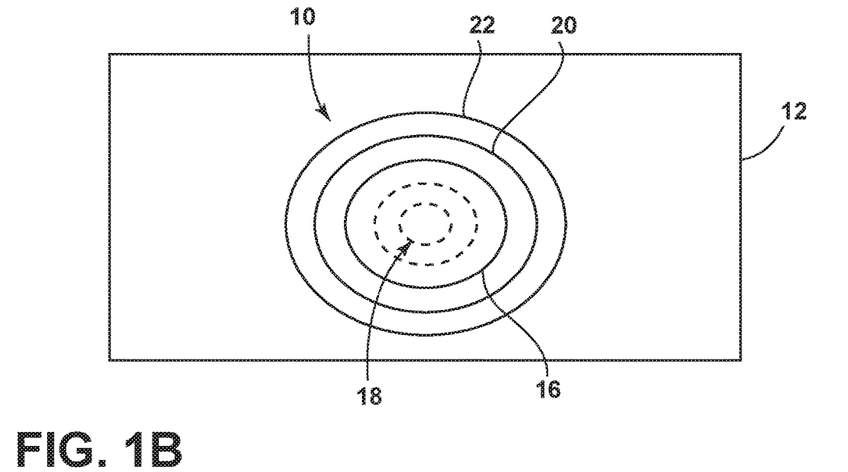
FIG. 1B is a top view of a luminescent structure rendered as a discrete particle, according to various embodiments.
Figure 1C:
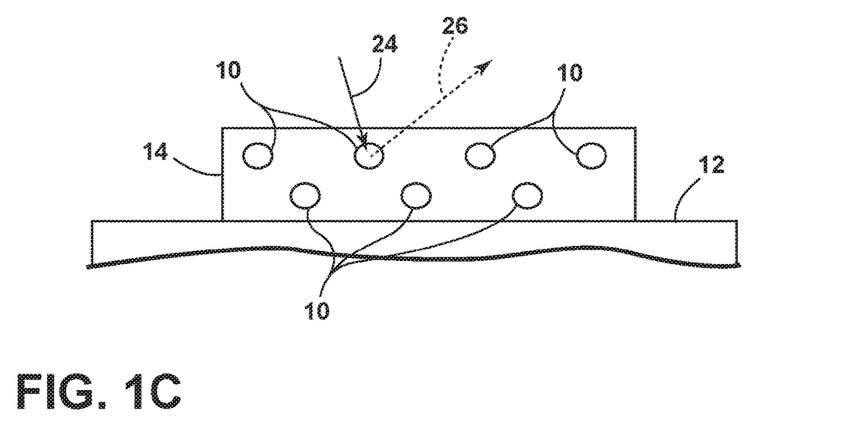
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an emitted light 24 of a specific wavelength, thereby causing the light to undergo a conversion process. Under the principle of down conversion, the emitted light 24 is converted into a longer wavelength, converted light 26 that is outputted from the luminescent structure 10. Conversely, under the principle of up conversion, the emitted light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 94 (FIG. 5) is referred to herein as emitted light 24 and is illustrated herein as solid arrows. In contrast, light emitted from the luminescent structure 10 is referred to herein as converted light 26 and is illustrated herein as broken arrows. The mixture of emitted light 24 and converted light 26 that may be emitted simultaneously is referred to herein as outputted light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the emitted light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in its entirety.

According to various embodiments, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the emitted light 24 and the moment when the light intensity of the converted light 26 emitted from the luminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to various embodiments, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in some embodiments, the rare earth aluminum garnet type Ce phosphor may serve as the luminescent material 18 with ultra-short-persistence characteristics, which can emit the converted light 26 by absorbing purple to blue emitted light 24 emitted from a light source 94. According to various embodiments, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Kingsley et al., the entire disclosure of which is incorporated herein by reference.

Additionally, or alternatively, the luminescent material 18, according to various embodiments, disposed within the luminescent structure 10 may include a long-persistence luminescent material 18 that emits the converted light 26, once charged by the emitted light 24. The emitted light 24 may be emitted from any excitation source (e.g., any natural light source, such as the sun, and/or any artificial light sources 94). The long-persistence luminescent material 18 may be defined as having a long decay time due to its ability to store the emitted light 24 and release the converted light 26 gradually, for a period of several minutes or hours, once the emitted light 24 is no longer present.

The long-persistence luminescent material 18, according to various embodiments, may be operable to emit light at or above an intensity of 0.32 mcd/m² after a period of 10 minutes. Additionally, the long-persistence luminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 94 that emit the emitted light 24, including, but not limited to, natural light sources (e.g., the sun) and/or any artificial light sources 94. The periodic absorption of the emitted light 24 from any excitation source may provide for a substantially sustained charge of the long-persistence luminescent material 18 to provide for consistent passive illumination. In some embodiments, a light sensor may monitor the illumination intensity of the luminescent structure 10 and actuate an excitation source when the illumination intensity falls below 0.32 mcd/m², or any other predefined intensity level.

The long-persistence luminescent material 18 may correspond to alkaline earth aluminates and silicates, for example doped di-silicates, or any other compound that is capable of emitting light for a period of time once the emitted light 24 is no longer present. The long-persistence luminescent material 18 may be doped with one or more ions, which may correspond to rare earth elements, for example, $Eu^{2+}$, $Tb^{3+}$ and/or $Dy^3$. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various embodiments, may be a translucent white color, and in some instances reflective, when unilluminated. Once the luminescent structure 10 receives the emitted light 24 of a particular wavelength, the luminescent structure 10 may emit any color light (e.g., blue or red) therefrom at any desired brightness. According to various embodiments, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the emitted light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Referring to FIG. 2, a vehicle 28 is illustrated incorporating a lighting assembly 30, according to one embodiment. The vehicle 28 includes a vehicle body 32, a front door 34, a rear door 36, a rocker panel 38, and a rocker panel trim member 40. The rocker panel 38 extends between a front wheel well 42 and a rear wheel well 44 along a bottom side 46 of the vehicle 28. When installed, the rocker panel trim member 40 conceals or covers a portion, or all, of the rocker panel 38. The trim member 40 may be installed on the front door 34 and/or the rear door 36. Alternatively, and/or additionally, the rocker panel trim member 40 may be disposed below the front door 34, the rear door 36, and/or along the body 32 of the vehicle 28.

The lighting assembly 30 may be disposed within the trim member 40. The lighting assembly 30 provides light from the trim member 40, which in turn illuminates a ground surface 48 (or a portion thereof) and/or an area proximate the trim member 40. For example, the trim member 40 incorporating the lighting assembly 30 may illuminate an area laterally outward from the vehicle 28, forward of the vehicle 28, and/or rearward of the vehicle 28. According to one embodiment, the vehicle 28 is configured as an emergency vehicle, such as a police vehicle, an ambulance, a security vehicle, and the like. Other vehicles incorporating lighting assemblies may also include the lighting assembly 30 provided herein. For example, other public vehicle and/or construction vehicles may also utilize the lighting assembly 30 provided herein. The lighting assembly 30 may be configured to provide visual signaling, such as flashing lights and strobes, to indicate its presence to other road users.

Although only one side of the vehicle 28 is shown in FIG. 2, the rocker panel 38 and the rocker panel trim member 40 can extend on the other side of the vehicle 28 (not shown) and can also incorporate the lighting assembly 30 described herein. However, in various embodiments, the lighting assembly 30 may be incorporated only in one side of the vehicle 28 (e.g. driver side).

Referring still to FIG. 2, the trim member 40 may be installed on any part of a side portion 56 of the vehicle 28, including the door, the rocker panel 38, the wheel wells 42, 44, a fender 58, 60, or any other portion of the body 32 of the vehicle 28. Moreover, the trim member 40 may be installed on a rear portion 62 of the vehicle 28 and incorporated into a wide range of components, such as a rear taillamp assembly 64, a rear bumper 66, a tailgate 68, a tailgate latch system 70, a window 72, a rear window wiper 74, a spoiler 76, etc. Furthermore, the trim member 40 may be installed on a front portion 78 of the vehicle 28 in a wide range of components, including, but not limited to, a front bumper, a grill, a hood assembly, a headlight assembly, etc.

Figure 3:
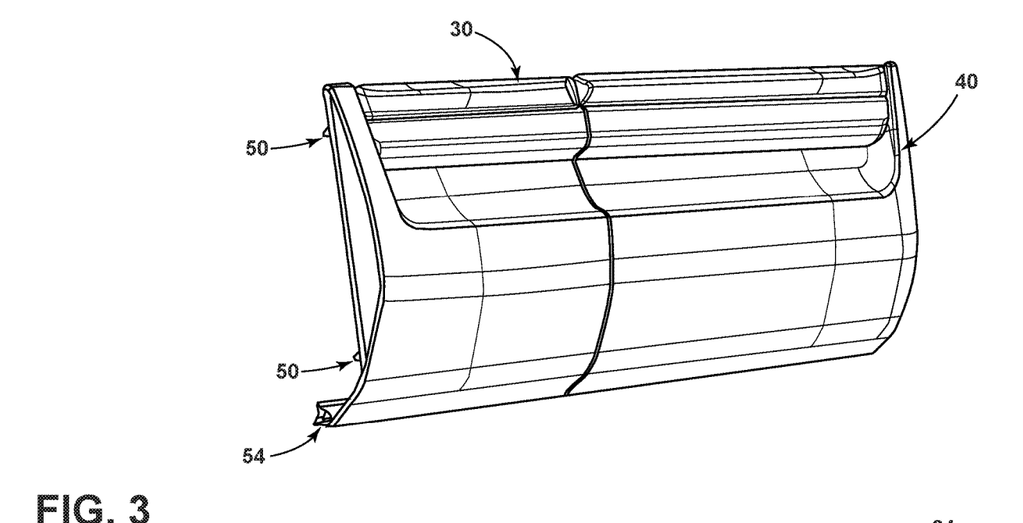
FIG. 3 is a front perspective view of the trim member, according to one embodiment.
Figure 4:
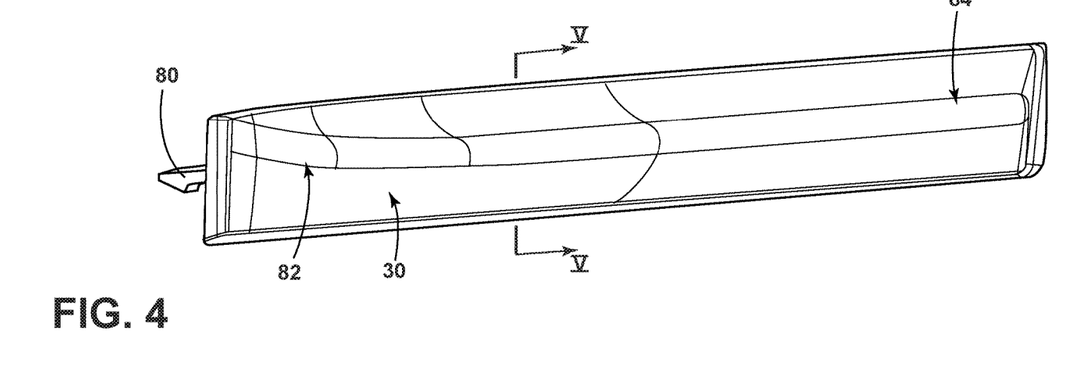
FIG. 4 is a front perspective view of the lighting assembly, according to the embodiment illustrated in FIG. 3.

Referring to FIGS. 3 and 4, the trim member 40 may be coupled to the front door 34, the rear door 36, the body 32, and/or any other vehicle structure via various mechanisms known to one of ordinary skill in the art. In one exemplary embodiment as shown in FIG. 3, the trim member 40 may include at least one clip 50, and a lower portion 52 (FIG. 2) of the front door 34 and/or the rear door 36 may include at least one corresponding clip receptacle. For coupling, the at least one clip 50 is inserted into the least one clip receptacle until the trim member 40 is mounted against the lower portion 52 of the front door 34 and/or the rear door 36. For increased retention of the trim member 40 to the front door 34 and/or the rear door 36, a plurality of clips 50 and clip receptacles may be used. Additionally, and/or alternatively, the trim member 40 may be adhesively, magnetically, mechanically coupled, and/or attached in any other manner known in the art to the vehicle 28 without departing from the scope of the present disclosure. Moreover, the front door 34 and/or the rear door 36 and the trim member 40 may be integrally formed in various embodiments.

In the exemplary embodiment of FIG. 3, the trim member 40 may include a lower lip 54 that may extend under the front door 34 and/or the rear door 36. The lower lip 54 may prevent and/or blocks debris from contacting and possibly damaging the front door 34 and/or the rear door 36. As defined herein, "debris" refers to any object, for example, road objects such as rocks and stones, which may cause chipping on the surface of the front door 34 and/or the rear door 36.

The trim member 40 may be formed from various materials known to one of ordinary skill in the art. For example, the trim member 40 may include a rigid material, such as a plastic or rigid polymeric material. To produce the desired shapes and dimensions of the trim member 40, the plastic material may be produced via extrusion, injection molding, or other processes known to one of ordinary skill in the art. In various embodiments, the trim member 40 may include a coating overlaying the plastic. The coating may include a paint material having protective materials.

Referring to FIGS. 3 and 4, the lighting assembly 30 is disposed in an upper portion of the trim member 40. However, the lighting strip may be disposed in any portion of the trim member 40 in various embodiments. The lighting assembly 30 includes a retainer 80 to removably couple the lighting assembly 30 to the trim member 40 and/or the door. Alternatively, any other method known in the art may be used to couple the lighting assembly 30 to the trim member 40. Alternatively still, the lighting assembly 30 and the trim member 40 may be integrally formed.

As illustrated in FIGS. 3 and 4, the lighting assembly 30 may have a curved or radiused outer profile 82 such that the emitted light 24 and/or the converted light 26 may be directed in one or more directions from the vehicle 28. For example, the emitted light 24 and/or the converted light 26 may be directed vehicle side-to-side, vehicle rearward, vehicle forward, and/or combinations thereof simultaneously. Directing light in multiple directions may increase the visibility of the vehicle 28 when one or more of the light sources 94 are activated. The lighting assembly 30 may further include a bumper portion 84 that may form an outboard portion 92 of the lighting assembly 30. The bumper portion 84 may be contacted prior to contact with any other components of the lighting assembly 30 and prevent damage arising from the contact to the components of the lighting assembly 30 and/or damage to the vehicle 28.

Figure 5:
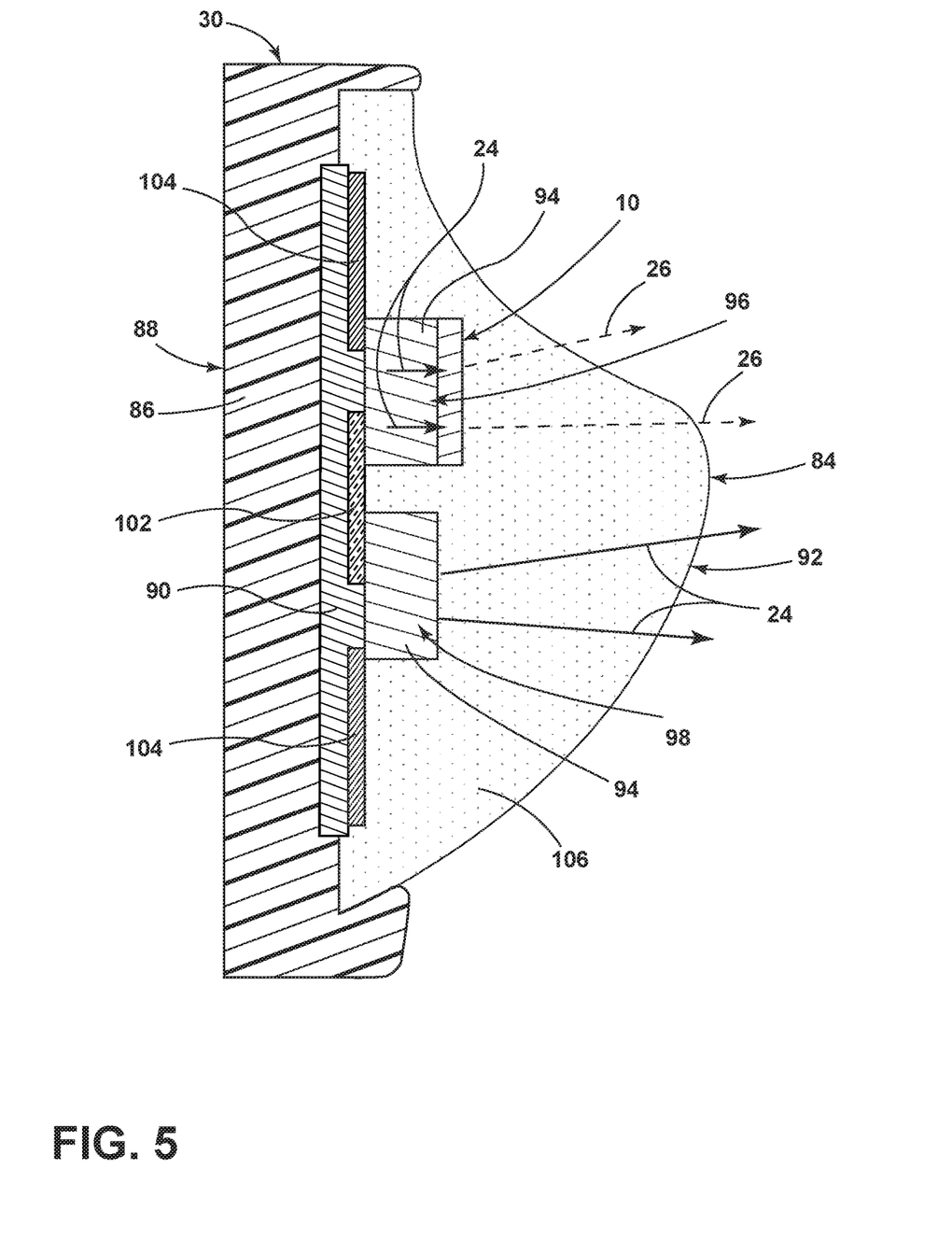
FIG. 5 is a cross-sectional view of the lighting assembly taken along the line V-V of FIG. 4, according to one embodiment.

Referring to FIG. 5, the lighting assembly 30 includes a back panel 86. The back panel 86 extends longitudinally along an inboard portion 88 of the lighting assembly 30 and may interface with the trim member 40 and/or the vehicle 28. In various embodiments, the back panel 86 may be thermally-conductive and electrically-insulating. The heat conduction properties allow the finished back panel 86 to effectively dissipate heat from heat-generating elements (for example, heat-generating printed circuits, microprocessors, silicon chips, and the like). The back panel 86 may also have electrical-insulation properties.

According to various embodiments, a substrate 90, such as a printed circuit board (PCB), may be disposed outboard of the back panel 86. The substrate 90 may contain control circuitry including light source drive circuitry for controlling activation and deactivation of one or more light sources 94 that may be deposited or printed on the substrate 90. The substrate 90 may be any type of circuit board including, but not limited to, any flexible and/or rigid circuit board.

With respect to the embodiments described herein, the light sources 94 may each be configured to emit visible and/or non-visible light, such as blue light, UV light, infrared, and/or violet light and may include any form of light source. For example, fluorescent lighting, light emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the lighting assembly 30.

According to some embodiments, the luminescent structure 10 is disposed on a first portion 96, or all, of the light sources 94. A second portion 98 of the light sources 94 may be free of a luminescent material. According to various embodiments, the light sources 94 within the first and second portions 96, 98 may emit a common wavelength of light (e.g., light within the blue emission spectrum). The luminescent structure 10, disposed on the first portion 96 of light sources 94, may luminesce in response to receiving emitted light 24 from the first portion 96 of light sources 94 in a second wavelength of light while the second portion 98 of light sources 94 may continue to emit the first wavelength of light. Accordingly, the lighting assembly 30 may contain light sources 94 that emit a common wavelength of light therefrom but produce two or more various colors of light to be emitted therefrom.

In one example, the light sources 94 may be printed and have largely-coplanar electrodes. An example of light sources 94 that may be used with the technology described herein is described in U.S. Pat. No. 8,415,879 to Lowenthal et al., which is incorporated by reference herein.

In various embodiments, individual light sources 94 (e.g., LEDs) may be disposed (e.g., printed, laminated, captured) on the substrate 90 (e.g., a thin film having a thickness of less than 0.25 millimeters, a thin film having a thickness of 0.2 millimeters, a thin film having a thickness of 0.1 to 0.15 millimeters, a thin film having a thickness of 0.07 to 0.1 millimeters, a thin film having a thickness of 0.006 to 0.012 millimeters, a flexible thin film). In FIGS. 5-10, discrete units appear to be illustrated as light sources 94, however, it is contemplated that the light sources 94 may include tens, hundreds, and/or thousands of light sources 94.

In some embodiments, LEDs may be used as the individual light sources 94. The LEDs may have a diameter ranging from 10 to 50 microns and a height ranging from 5 and 20 microns. In one example, the LEDs have a maximum width or length, whichever is longer, ranging from about 300 to 320 microns. In some embodiments, the individual light sources 94 (e.g., LEDs) have a diameter ranging from about 20 to 30 microns and a height ranging from about 5 to 50 microns. In one example, the LEDs have dimensions ranging from 230 to 300 microns on one side, 180 to 200 microns on a second side, and 50 to 80 microns in height. Therefore, examples provided herein that include measurements referencing a thickness with respect to a light source 94 may be within 80 microns of the distance stated since the thickness of the light sources 94 is determined by the thickness of the substrate 90 (where thickness of the light sources 94 is a measure of the height of the profile of the light sources 94 or, equivalently, a measure of the distance from the surface of the outermost layer of the substrate 90 to the side of the light sources 94 disposed away from the outermost layer of the substrate 90). It will be appreciated, however, that any measurements provided herein are non-limiting examples. Any light sources 94 provided within the lighting assembly 30 may be configured in any desired manner and within any distance of any other light sources 94 without departing from the teachings provided herein.

Furthermore, because the maximum width of unpackaged LEDs, which may be utilized as the light sources 94 of the currently described lighting assembly 30, is less than that of standard packaged LEDs, space between the centers of each LED may be reduced, which therefore increases the uniformity of the perceived light. In one example, the space between the centers of each unpackaged LED after being deposited is 0.05 millimeters. Since LEDs produce a "point" of light and because it is desirable in many applications to have uniform light (i.e., not being able to distinguish each point of light), as a rule of thumb, the diffusing offset distance (i.e., the minimum distance at which the light emitted from an LED array is perceived as uniform) may be approximately equal to the distance between the centers of adjacent LEDs. Therefore, for an LED light source 94, the diffusing offset distance may have a diffusing offset distance of approximately 0.05 millimeters.

It will be understood that the lighting assembly 30 may incorporate a single continuous light source 94 and/or a plurality of individual light sources 94. In examples where there are a plurality of light sources 94, some or all of the light sources 94 may be independently electrically connected (e.g., through a conductive ink). In independently electrically connected examples of the light sources 94, each of the light sources 94 may be independently addressable, which may allow a controller 100 (FIG. 11) to create static and dynamic patterns of light by independently illuminating certain light sources 94 and not others. In some instances, a machine may function to transfer unpackaged light sources 94 from a substrate such as a "wafer tape" to a product substrate, such as a circuit substrate. The direct transfer of unpackaged light sources 94 may reduce the thickness of an end product compared to a similar product produced by conventional means, as well as the amount of time and/or cost to manufacture the product substrate. Additional information on the formation of the plurality of light sources 94 and/or variously configured light-producing assemblies is disclosed in U.S. Patent Publication No. 2015/0136573 to Peterson et al. and U.S. Patent Publication No. 2016/0276205 to Huska et al., both of which are incorporated herein by reference.

Referring still to FIG. 5, the substrate 90 includes first and second conductive traces 102, 104 for powering the light sources 94. Any suitable type of technology can be utilized to implement the conductive traces 102, 104. The conductive traces 102, 104 may be composed of material that is reflective, opaque, or otherwise not translucent nor transparent. Alternatively, in some examples, the conductive traces 102, 104 may be translucent or transparent (e.g., by using indium tin oxide). The conductive traces 102, 104 may be created using conventional conductive ink or other similar processes. The conductive inks may be drawn or printed on a variety of substrate materials. These types of materials may contain conductive materials such as powdered or flaked silver and carbon-like materials. While conductive inks can be an economical way to deposit conductive traces 102, 104, traditional industrial standards such as etching of conductive traces 102, 104 may be used on the substrate 90. In yet another example, the conductive traces 102, 104 may be premade similarly to photo-etched copper and can have a secondary conductive bond material (e.g., solder) applied to the premade conductive traces 102, 104 to facilitate attachment.

According to various embodiments, as illustrated in FIG. 5, the lighting assembly 30 may include first and second light sources 94 that share a common first conductive trace 102 (e.g., a negative electrode). Each of the light sources 94 may be independently connected to an opposite second conductive trace 104 having an opposite polarity (e.g., positive electrode). Accordingly, the light sources 94 may be disposed closer to one another on the substrate 90 and/or the cost of producing the lighting assembly 30 may be reduced.

An overmold material 106 covers, and/or contacts, the substrate 90 and the light sources 94. In some embodiments, the overmold material 106 is an electrically insulating material. The overmold material 106 may also be a thermally conductive thermoplastic material or a thermally conductive thermoset material that may have thermal conductivity values greater than about 1 W/m·K. If an electrically conducting material is used, then the conductive traces 102, 104, LED leads, any printed circuitry, and/or other exposed conductors may be coated with an insulative dielectric before disposing the overmold material 106 thereon.

The overmold material 106 may protect the light sources 94 and/or the substrate 90 from physical and chemical damage arising from environmental exposure. The overmold material 106 may have viscoelasticity (i.e., having both viscosity and elasticity), a low Young's modulus, and/or a high failure strain compared with the front door 34 and/or the rear door 36 so that the overmold material 106 may protect the light sources 94 and/or the substrate 90 when contact is made thereto.

The overmold material 106 may continue to have flexible properties at low temperatures, such as temperatures below 0 degrees Celsius. The overmold material 106 may include one or more additives. For example, the overmold material 106 may include one or more materials configured to inhibit the transmission of ultraviolet (UV) light therethrough. Some examples of UV inhibitors that may be integrated into the overmold material 106 may include the following: hindered amines (HALS) or other UV absorbers including oxanilides for polyamides, benzophenones for PVC, and benzotriazoles and hydroxyphenyltriazines for polycarbonate. The UV inhibitors may be configured to block UV light from environmental light sources impinging upon the overmold material 106 from activating the luminescent structure 10. According to various embodiments, the overmold material 106 may be formed from a material containing silicone therein.

Figure 6:
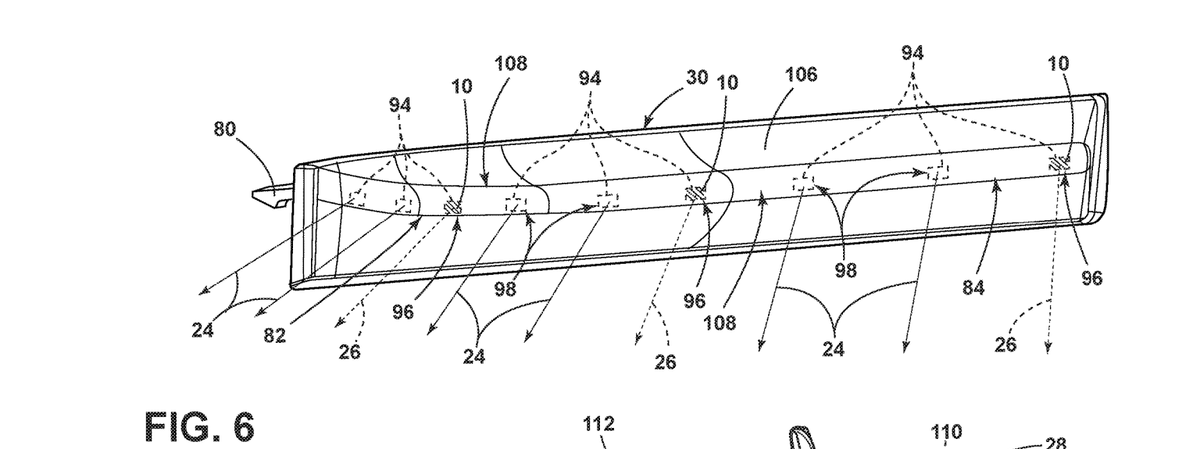
FIG. 6 is a front perspective view of the lighting assembly having first and second portions of light sources, according to one embodiment.
Figure 7:
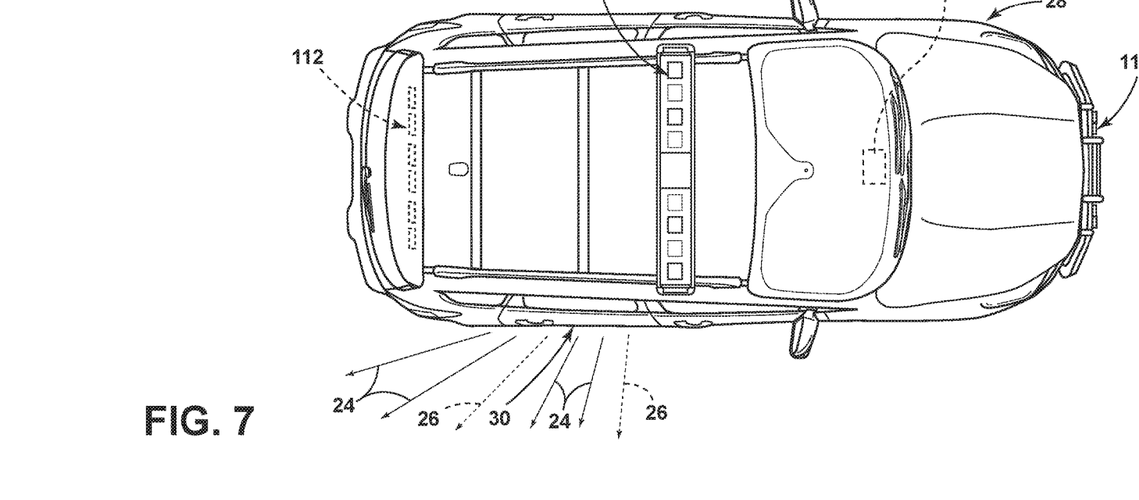
FIG. 7 is a top plan view of the vehicle employing the lighting assembly on a lateral side portion, according to one embodiment.

Referring to FIGS. 6 and 7, the overmold material 106 of the lighting assembly 30 may include an integrally formed lens 108. The lens 108 is configured to direct light emitted from the light sources 94 towards a desired location. For example, the lens 108 may be configured as a Fresnel lens, a pillow optic, and/or any other type of lens or optic that is configured to disperse, concentrate, and/or otherwise direct light emitted from the light sources 94 therethrough in any desired manner and/or towards any desired location.

Still referring to FIGS. 6 and 7, to compensate for the sensitivity of the human eye to different colors, the first portion 96 of light sources 94 may vary from the second portion 98 of light sources 94. For example, according to various embodiments, the light sources 94 may emit emitted light 24 in the blue emission spectrum. As described above, the first portion 96 of light sources 94 may have the luminescent structure 10 thereon that luminesces in a wavelength different from the emitted light 24, such as a wavelength in the red emission spectrum. The second portion 98 of light sources 94 may be free of the luminescent structure 10 thereby providing emitted light 24 in the blue emission spectrum from the light assembly.

In order to generally mimic the perception of the human eye, the first and second portions 96, 98 of light sources 94 may have varied concentrations or amounts of light sources 94 within the lighting assembly 30. For example, the human eye is roughly twice as sensitive to light in the red emission spectrum as light in the blue emission spectrum. Accordingly, the first portion 96 of light sources 94 that is operably coupled with the luminescent structure 10 and luminesce in the red emission spectrum may have half as many light sources 94 as the second portion 98 of light sources 94 that provides emitted light 24 in blue emission spectrum to compensate for the variance in sensitivities to various wavelengths of light.

The first and second portions 96, 98 of light sources 94 may illuminate separately from one another. Additionally, and/or alternatively, the first and second portions 96, 98 of light sources 94 may illuminate simultaneously. It is contemplated that the light sources 94 may illuminate for any desired reason and may be automatically activated based on the vehicle 28 achieving any predefined event, such as a vehicle hazard signal being activated. In such a scenario, the first portion 96 of light sources 94 may illuminate contemporaneously with any other hazard lights disposed on the vehicle 28. Alternatively, the lighting assembly 30 may include a user interface 110 in which an occupant of the vehicle 28 may choose whether the light sources 94 are activated and/or the manner or pattern in which the light sources 94 are illuminated. Moreover, the light sources 94 within the lighting assembly 30 may illuminate simultaneously with any other light systems 112 disposed on the vehicle 28. For example, the lighting assembly 30 may flash between the first and second portions 96, 98 in conjunction with additional emergency vehicle light systems 112 disposed on the vehicle 28. The additional light systems 112 may be disposed on the front portion 78, the side portion 56, the rear portion 62, and/or the top portion of the vehicle 28.

Figure 8:
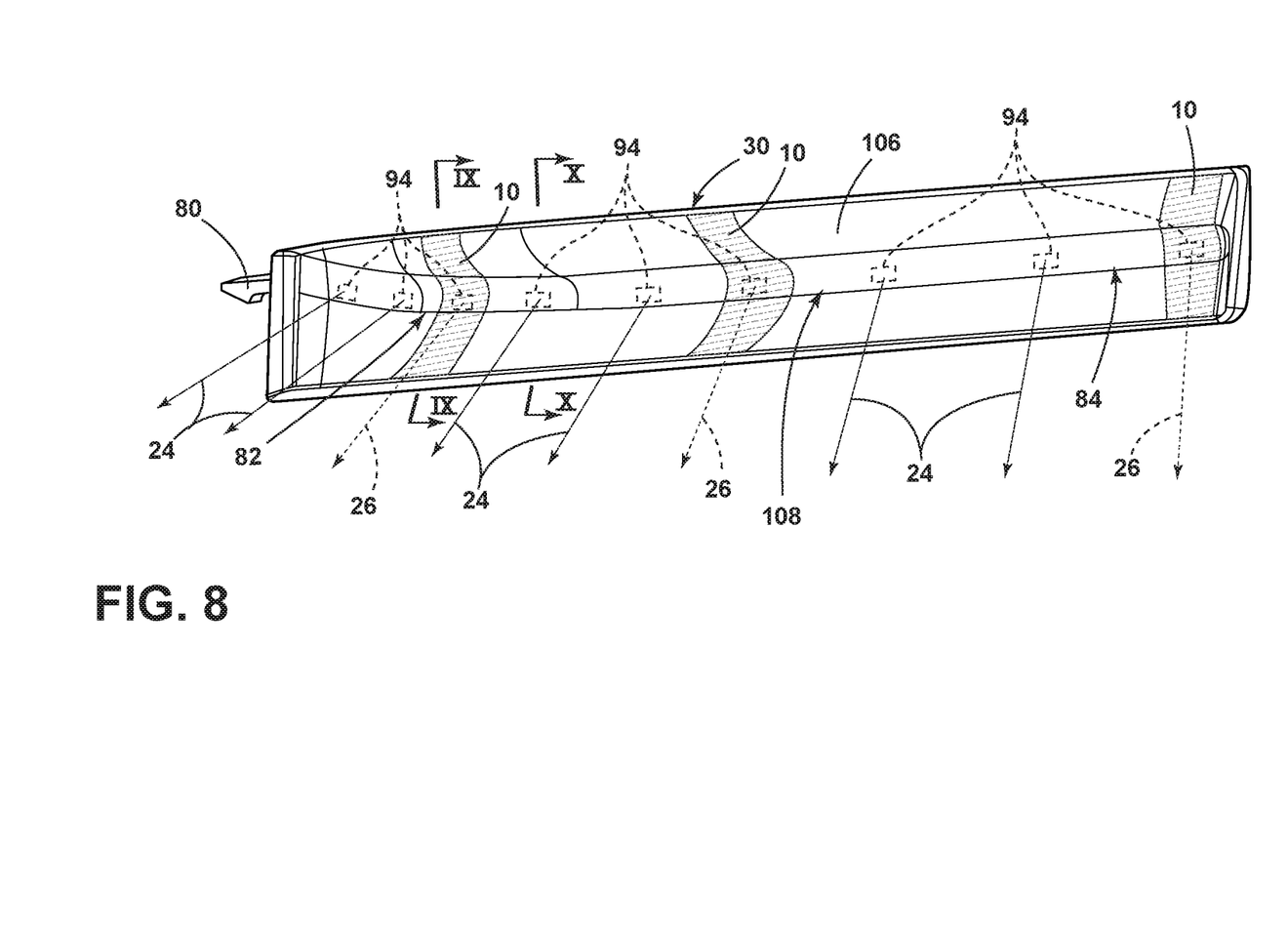
FIG. 8 is a front perspective view of the lighting assembly having first and second portions of light sources, according to an alternate embodiment.
Figure 9:
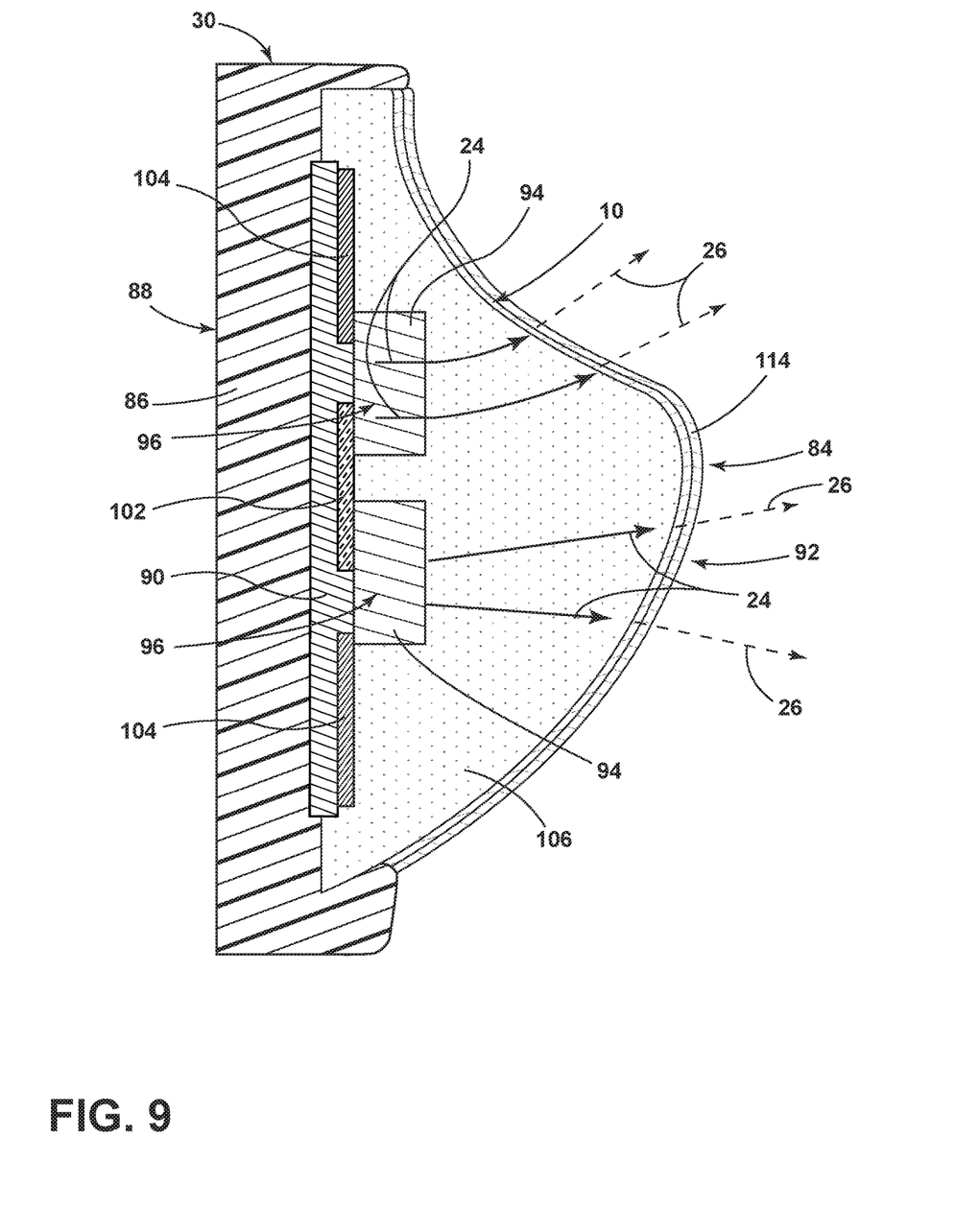
FIG. 9 is a cross-sectional view of the lighting assembly taken along the line IX-IX of FIG. 8.
Figure 10:
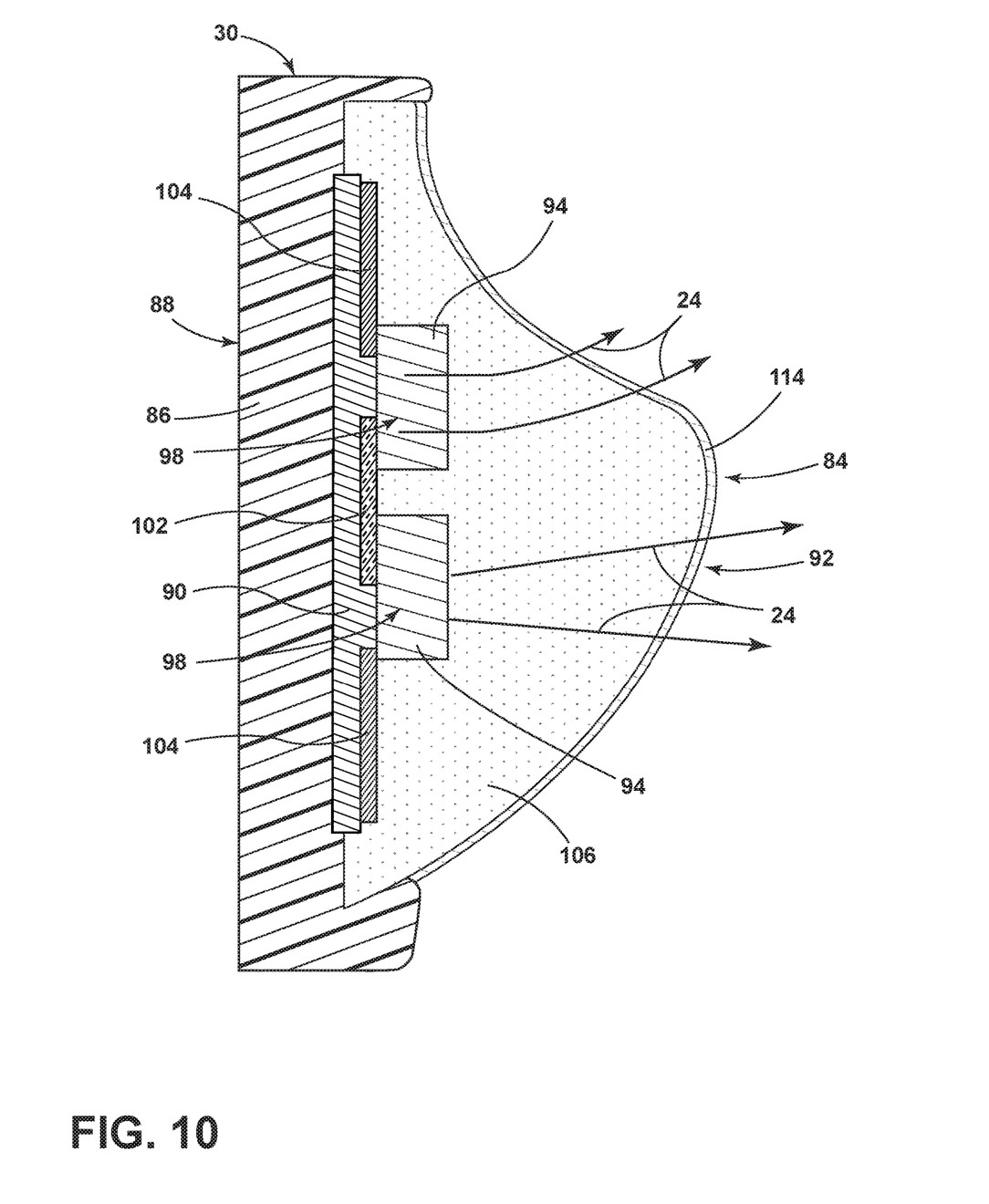
FIG. 10 is a cross-sectional view of the lighting assembly taken along the line X-X of FIG. 8.

Referring to FIGS. 8-10, the luminescent structure 10 may be disposed on one or more sections of the overmold material 106 in addition to, or in lieu of, disposing the luminescent structure 10 on a portion of the light sources 94. Additionally, and/or alternatively, the luminescent structure 10 may be disposed within portions of the overmold material 106. Accordingly, as the emitted light exits the overmold material 106, the luminescent structure 10 luminesces in a wavelength that is varied from the emitted light. According to various embodiments, the luminescent structure 10 discussed herein is substantially Lambertian, that is, the apparent brightness of the luminescent structure 10 is substantially constant regardless of an observer's angle of view.

Referring to FIGS. 9 and 10, in some embodiments, a decorative layer 114 may be disposed outwardly of the overmold material 106. However, the decorative layer 114 may be disposed in any other location within the lighting assembly 30 in alternate embodiments. The decorative layer 114 may include a material that is configured to control or modify an appearance of the overmold material 106 and/or the lighting assembly 30. For example, the decorative layer 114 may be configured to confer a metallic appearance to the overmold material 106. The metallic appearance can be disposed outboard (or inboard) of the overmold material 106 through any method known in the art, including, but not limited to, sputter deposition, vacuum deposition (vacuum evaporation coating), electroplating, or directly printing onto a component of the lighting assembly 30. The metallic appearance may be chosen from a wide range of reflective materials and/or colors, including, but not limited to, silver, chrome, copper, bronze, gold, or any other metallic surface.

Additionally, an imitator of any metallic material may also be utilized without departing from the teachings provided herein. In various embodiments, the decorative layer 114 may be tinted any color to complement the vehicle structure on which the lighting assembly 30 is to be received.

In some embodiments, the decorative layer 114 may have a textured or grained surface. The grained surface may be produced by laser etching the overmold material 106 and may provide for the emitting surface to match the appearance of the outboard portion 92. In any event, the decorative layer 114 may be at least partially light transmissible.

Figure 11:
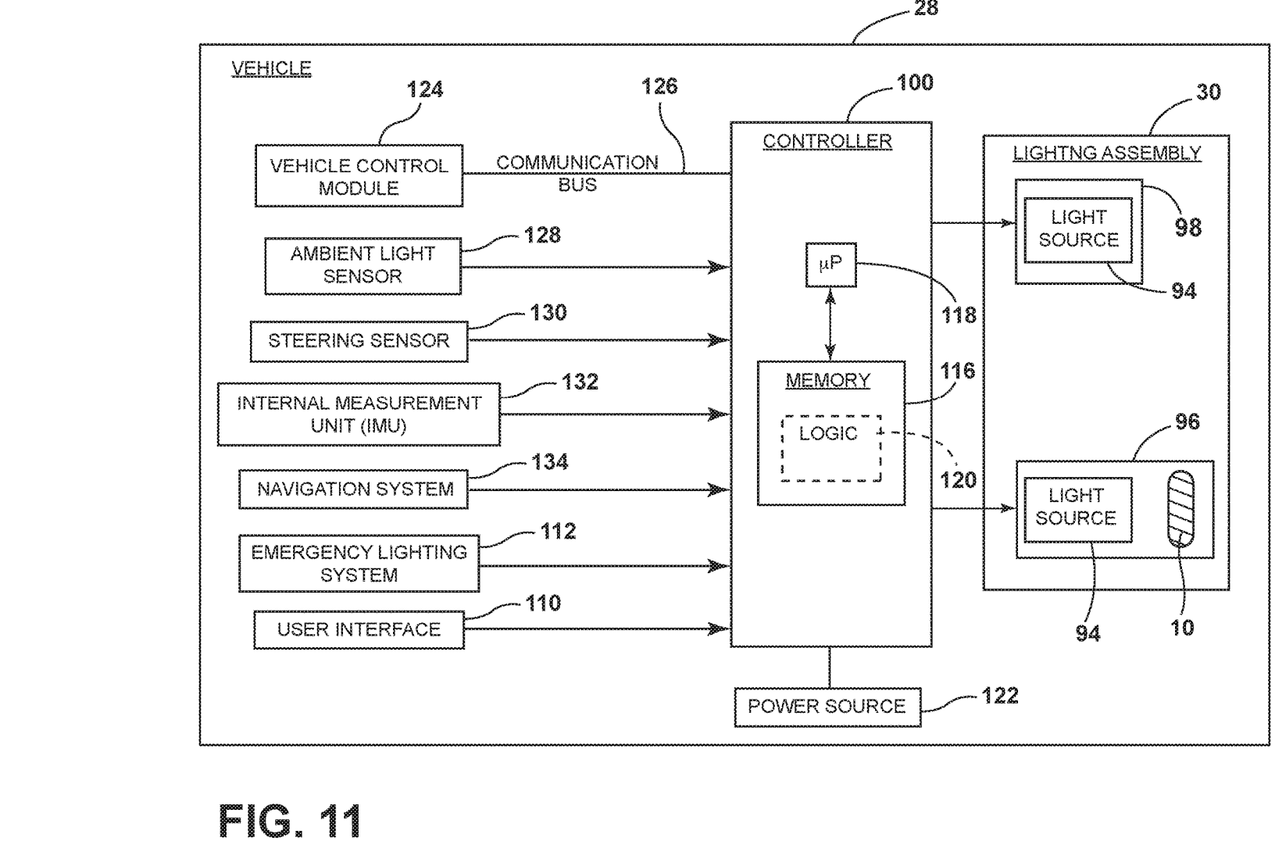
FIG. 11 is a block diagram showing the vehicle having the lighting assembly therein operably coupled with one or more controls within the vehicle.

Referring to FIG. 11, a block diagram of the vehicle 28 is generally shown in which the lighting assembly 30 is implemented. The lighting assembly 30 is further illustrated having the controller 100 receiving various inputs and controlling the first and second portions 96, 98 of light sources 94 by applying signals to the light sources 94. The controller 100 may include a microprocessor 118 and memory 116 as illustrated, according to one embodiment. It should be appreciated that the controller 100 may include control circuitry such as analog and/or digital control circuitry. Logic 120 is stored within memory 116 and executed by the microprocessor 118 for processing the various inputs and controlling each of the plurality of light sources 94, as described herein. The controller 100 is coupled with a power source 122 disposed onboard the vehicle 28.

According to various embodiments, the controller 100 may be in communication with the vehicle control module 124 via a communication bus 126 of the vehicle 28. The communication bus 126 may be configured to deliver signals to the controller 100 identifying various vehicle states. For example, the communication bus 126 may be configured to communicate to the controller 100 a drive selection of the vehicle 28, an ignition state, a door 34, 36 positional status, a lighting state, a braking condition, vehicle velocity or speed, a remote activation of the lighting assembly 30, or any other information or control signals that may be utilized to activate one or more lighting assemblies. Though the controller 100 is discussed herein, in some embodiments, the lighting assembly 30 may be activated in response to an electrical or electro-mechanical switch of the vehicle 28.

The controller 100 may further be in communication with an ambient light sensor 128. The ambient light sensor 128 may be operable to communicate a light condition, for example a level of brightness or intensity of the ambient light proximate the vehicle 28. In response to the level of the ambient light, the controller 100 may be configured to adjust a light intensity of the emitted light from the lighting assembly 30. The intensity of the light output from the lighting assembly 30 may be adjusted by the controller 100 by pulse-width modulation and/or controlling a duty cycle, current, or voltage supplied to the lighting assembly 30.

The controller 100 may be in communication with one or more vehicle sensors that may be utilized to control one or more activation sequences or a timing of an activation of the lighting assembly 30. For example, the controller 100 may be in communication with a steering sensor 130, an inertial measurement unit (IMU) 132, a navigation system 134, etc.

The steering sensor 130 may correspond to a steering angle detection apparatus, which may be incorporated as a module of a power steering system of the vehicle 28. The steering angle may be detected by the steering sensor 130 via various sensory devices, for example a potentiometer, angular encoder, and various forms of sensors that may be in communication with the controller 100. Accordingly, the controller 100 may be configured to activate a sequence of an illumination of each of the lighting assembly 30 in response to a steering angle of the vehicle 28.

The IMU 132 may correspond to one or more accelerometers, gyroscopes, and various other forms of sensors operable to detect motion or navigational data of the vehicle 28. Such devices may be configured to a detect directions and magnitudes of forces acting on the vehicle 28. Accordingly, the controller 100 may be configured to activate each of the lighting assembly 30 based on a detected motion of the vehicle 28 identified by the IMU 132 of the vehicle 28.

The navigation system 134 may correspond to a global positioning system (GPS) based navigational device configured to identify a heading and/or location of the vehicle 28. Additionally, the navigation system 134 may be configured to identify one or more pending navigational directions (e.g. future turns) of the vehicle 28. The navigation system 134 may communicate such navigation data to the controller 100 such that the controller 100 may selectively activate one or more control algorithms or lighting sequences of the lighting assembly 30.

Additionally, the controller 100 may be in communication with an emergency light systems 112. The emergency light systems 112 may correspond to at least one user interface 110 configured to selectively activate one or more emergency lights, sirens, or other devices that may be used on an emergency vehicle, first responder, law enforcement, construction, and/or public works vehicle. Accordingly, the lighting assembly 30 may be incorporated with one or more alert systems or devices.

The user interface 110 may be utilized for setting a plurality of desired lighting effects of the lighting assembly 30. The user interface 110 may be an independent system, or integrated into any other system, such as a human machine interface (HMI), of the vehicle 28. The user interface 110 may be configured such that a user may control the wavelength of emitted light 24 that is emitted by the light sources 94 or a pattern of illumination. For example, an occupant may control the light pulse frequency, light pulse amplitude, light color variations, and/or individual light patterns through usage of the user interface 110.

In operation, the light sources 94 may provide emitted light 24 of varying wavelengths, as provided herein. In response, the luminescent structure 10, which may be operably coupled with the first portion 96 of light sources 94, may exhibit periodic unicolor or multicolor illumination. In some embodiments, the controller 100 may be configured to adjust a color of the emitted light 24 by sending control signals to adjust an intensity or energy output level of the light sources 94. For example, if the light sources 94 are configured to output a first wavelength at a low level, substantially all of the first wavelength may be converted to the second wavelength by the one or more luminescent structures 10. If the light sources 94 are configured to output a first wavelength at a high level, only a portion of the first wavelength may be converted to the second wavelength. In this configuration, a color of light corresponding to mixture of the first wavelength and the second wavelength may be output from the lighting assembly 30.

Though a low level and a high level of intensity are discussed in reference to the first wavelength of emitted light 24, it shall be understood that the intensity of the first wavelength of emitted light 24 may be varied among a variety of intensity levels to adjust a hue of the color corresponding to the emitted light from the lighting assembly 30. The variance in intensity may be manually altered, or automatically varied by the controller 100 based on predefined conditions.

As described herein, the color of the converted light 26 may be significantly dependent on the particular luminescent materials 18 utilized in the luminescent structure 10. Additionally, a conversion capacity of the luminescent structure 10 may be significantly dependent on a concentration of the luminescent material 18 utilized in the luminescent structure 10. By adjusting the range of intensities that may be output from the light sources 94, the concentration, types, and proportions of the luminescent materials 18 in the luminescent structure 10 discussed herein may be operable to generate a range of color hues of the emitted light by blending the first wavelength with the second wavelength.

A variety of advantages may be derived from the use of the present disclosure. For example, use of the disclosed lighting assembly 30 provides a unique aesthetic appearance to the vehicle 28. Moreover, the lighting assembly 30 may provide lighting to the occupants of the vehicle 28 and/or notify vehicles proximate to the vehicle 28 of the location of the vehicle 28. The lighting assembly 30 may also provide for exterior lighting in a protected location. The lighting assembly 30 may be manufactured at low costs when compared to standard vehicle lighting assemblies.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle lighting assembly comprising:
a back panel configured to couple to a vehicle;
a plurality of light sources comprising a first portion and a second portion, the plurality of light sources configured to emit a common first wavelength of emitted light;
a luminescent structure operably coupled to the first portion of the plurality of light sources and configured to convert the common wavelength to a different second wavelength of visible light, wherein the second portion is free of the luminescent structure;
a first conductive trace and a plurality of second conductive traces disposed on a substrate, wherein each of the second conductive traces is configured to independently power the first and second portions of the plurality of light sources, and the first and second portions of the plurality of light sources share the first conductive trace; and
an overmolded cover layer disposed over the plurality of light sources, wherein the first portion is configured to emit the different second wavelength through the cover layer and the second portion is configured to emit the common first wavelength through the cover layer.

2. The vehicle lighting assembly of claim 1, wherein the back panel is removably disposed within a trim member.

3. The vehicle lighting assembly of claim 2, wherein the trim member is disposed on a lower portion of a door of the vehicle.

4. The vehicle lighting assembly of claim 1, wherein the first and second light portions of the plurality of light sources emit at least one of blue light, violet light, infrared and ultraviolet light.

5. The vehicle lighting assembly of claim 1, wherein the luminescent structure includes at least one luminescent material therein configured to convert an emitted light received from the first portion of light sources into a visible converted light comprising the different second wavelength.

6. The vehicle lighting assembly of claim 1, wherein an outboard portion of the cover layer forms a radiused surface that is configured to emit light laterally adjacent to the vehicle and to emit light toward a rear portion of the vehicle.

* * * * *